United States Patent [19]
Brandt et al.

[11] Patent Number: 5,621,767
[45] Date of Patent: Apr. 15, 1997

[54] METHOD AND DEVICE FOR LOCKING ON A CARRIER SIGNAL BY DIVIDING FREQUENCY BAND INTO SEGMENTS FOR SEGMENT SIGNAL QUALITY DETERMINATION AND SELECTING BETTER SIGNAL QUALITY SEGMENT

[75] Inventors: Andrew Brandt, Frederick; Sasan Rostami, Germantown, both of Md.

[73] Assignee: Hughes Electronics, Los Angeles, Calif.

[21] Appl. No.: 316,044

[22] Filed: Sep. 30, 1994

[51] Int. Cl.$^6$ ................................................ H04L 27/06
[52] U.S. Cl. .................... 375/344; 375/326; 375/317; 375/340; 375/375; 455/161.3; 455/164.2; 455/150.1; 455/226.2; 348/735; 340/825.03
[58] Field of Search ........................ 375/344, 317, 375/326, 327, 340, 373, 371, 375, 376, 224, 346, 347, 200, 202; 348/735; 455/161.1, 161.3, 164.1, 164.2, 150.1, 226.2; 380/34; 340/825.03, 825.1, 825.13

[56] References Cited

U.S. PATENT DOCUMENTS

| 4,169,993 | 10/1979 | Taylor et al. | 380/34 |
| 4,780,909 | 10/1988 | Sakashita et al. | 455/161.3 |
| 5,199,109 | 3/1993 | Bako | 455/161.2 |
| 5,212,803 | 5/1993 | Uddenfeldt et al. | 455/33.1 |
| 5,214,788 | 5/1993 | Delaperricre et al. | 455/32.1 |
| 5,428,825 | 6/1995 | Tomohiro et al. | 455/186.1 |

*Primary Examiner*—Wellington Chin
*Assistant Examiner*—William Luther
*Attorney, Agent, or Firm*—John T. Whelan; Wanda Denson-Low

[57] ABSTRACT

The present invention provides a method and device for locking onto a carrier signal located within a frequency band of a digitally modulated analog signal. More particularly, the method includes the steps of: dividing the frequency band into a plurality of segments, measuring a signal quality value for each of the segments, selecting one of the segments based on the measured signal quality values, and sweeping the selected segment using front-end circuitry in a receiver adapted to lock onto the carrier signal. The device according to an embodiment of the present invention includes a controller, a signal quality measurement unit, and a receiver including a front-end circuit. The controller executes a program that includes a first routine for dividing the frequency band into a plurality of segments. The measurement unit responds to the controller and measures a signal quality value for each of the segments. The program also includes a second routine for selecting one of the segments based on the measured signal quality value for each segment. The front-end circuit is coupled to the controller and sweeps the segment selected by the second routine in order to lock onto the carrier signal. The second routine preferably selects the segment having the highest signal quality value. Accordingly, the present invention provides a method and device for quickly and accurately locking onto a carrier signal located within a frequency band of a digitally modulated analog signal.

19 Claims, 9 Drawing Sheets

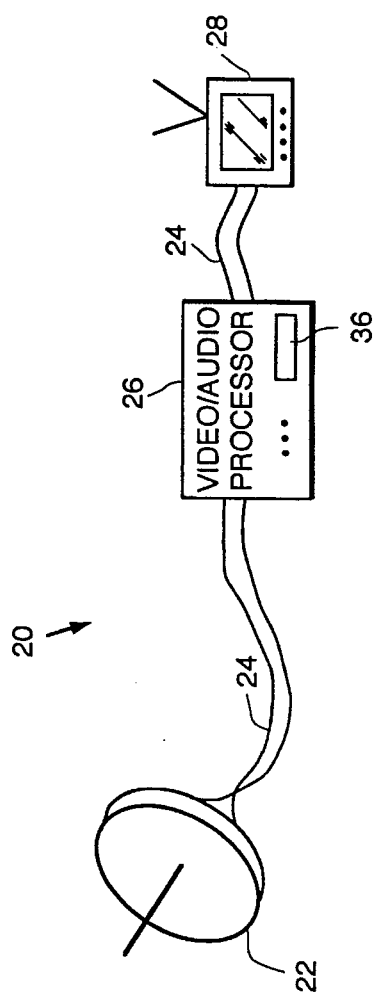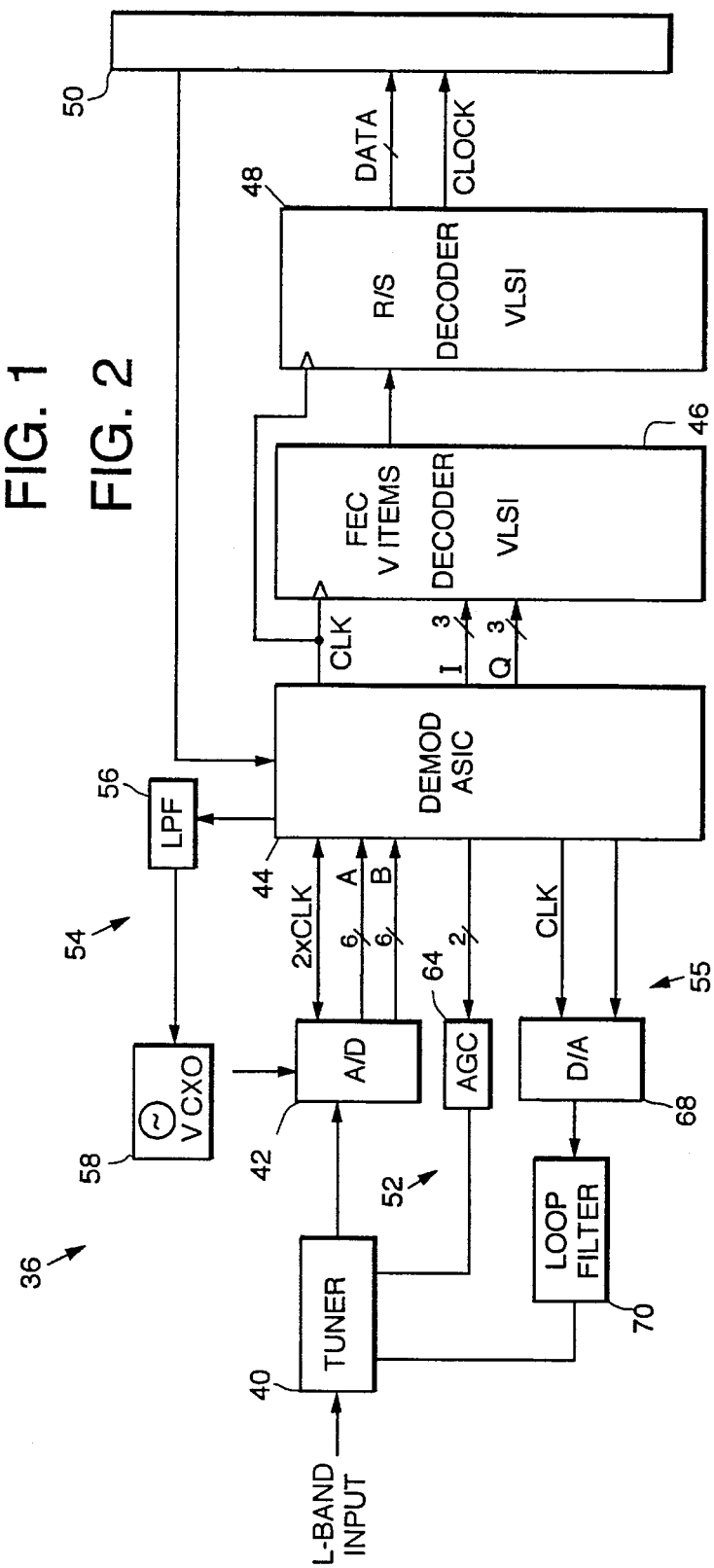
FIG. 1
FIG. 2

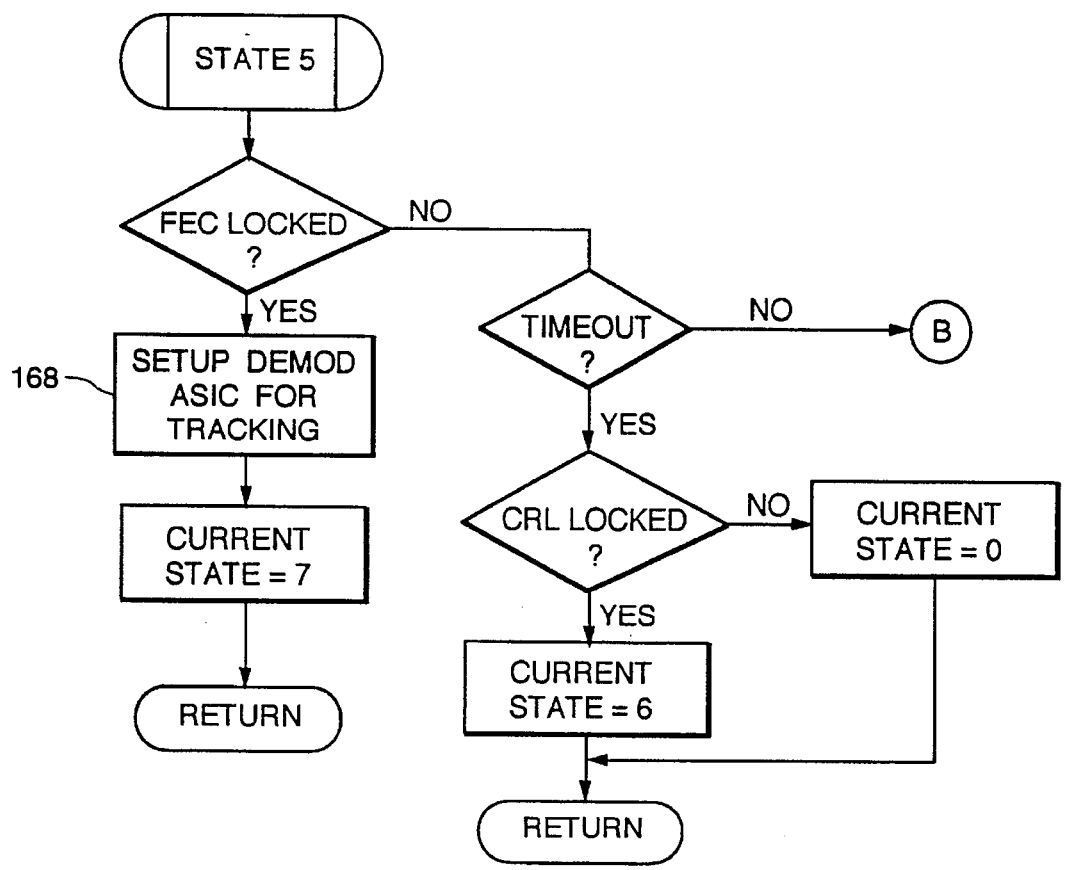
FIG. 12
FIG. 13
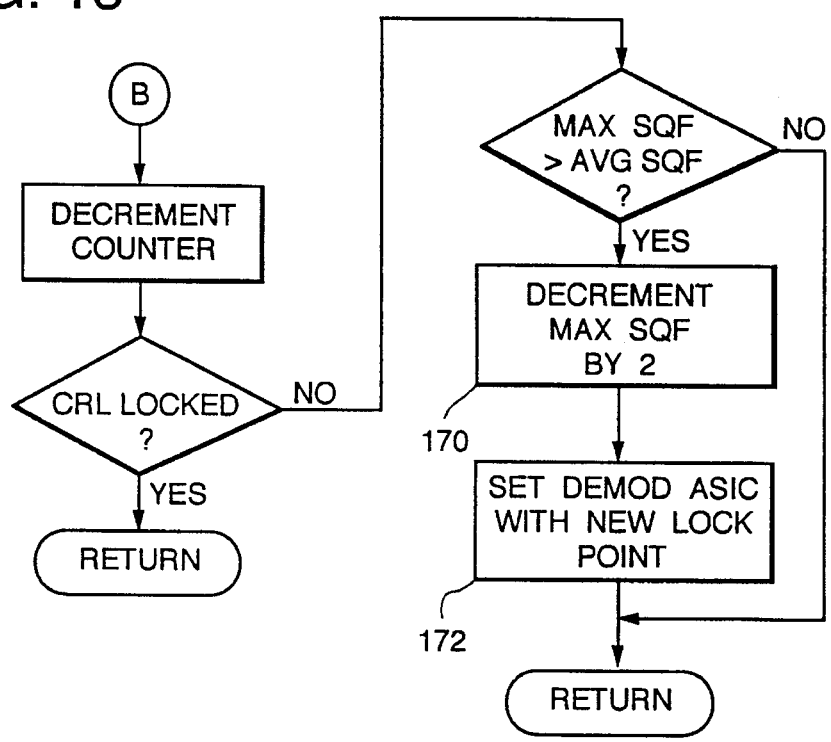

METHOD AND DEVICE FOR LOCKING ON A CARRIER SIGNAL BY DIVIDING FREQUENCY BAND INTO SEGMENTS FOR SEGMENT SIGNAL QUALITY DETERMINATION AND SELECTING BETTER SIGNAL QUALITY SEGMENT

BACKGROUND OF THE INVENTION

Conventional communication systems include a receiver for receiving and processing transmitted waveforms. One type of receiver is part of a "wireless cable" system that allows consumers to receive directly in their homes up to 150 television channels broadcast from a pair of powerful satellites. The receiver includes a small 18 inch satellite dish connected by a cable to a video processor unit. The satellite dish is aimed toward the satellites, and the video processor unit is connected to the user's television in a similar fashion as a conventional VCR.

On the transmission side, video and audio signals are digitally encoded into a data stream using a number of algorithms, including convolutional error correction algorithms. The encoded data stream is then compressed to reduce bandwidth requirements, modulated up to a high frequency Ku-band signal, transmitted to the satellite, and relayed from the satellite to the satellite dish located at the user's home. The satellite dish shifts the Ku-band signal down to an L-band signal which is transmitted through the cable to the video processor unit.

In the video processor unit, front-end circuitry receives the L-band signal and converts it into the original digital data stream of video/audio signals. The digital data stream is fed to video/audio decoder circuits that perform video/audio processing functions such as demultiplexing and decompression. A micro-controller controls the overall operation of the receiver, including the selection of receiver parameters, the setup and control of front-end circuit components, channel selection, viewer access to different programming packages, blocking certain channels, and many other functions.

In the above-described system, the receiver needs to lock onto a carrier signal within the frequency band of the digitally modulated L-Band signal before the signal can be converted into the original digital data stream of video/audio signals. The carrier signal is known to be within a predefined frequency band. However, due to transmission effects, the exact frequency and phase of the carrier signal is not known.

A traditional method of locking onto the carrier signal involves first setting a threshold value in the receiver based on an expected signal quality factor (SQF) value. The receiver then sweeps the entire frequency band measuring the signal quality. The receiver attempts to lock onto the carrier signal when the measured SQF exceeds the threshold value.

Under the above-described locking method, the threshold value cannot be set in the receiver with great accuracy primarily because signal to noise ratio for the carrier signal is not known in advance. If the threshold value is set too high, then the receiver may not lock onto the signal. If the threshold value is set too low, the receiver may incorrectly lock onto background noise or a signal based on a carrier harmonic.

Accordingly, there is a need for a method and device for quickly and accurately locking onto a carrier signal located within a particular frequency band.

SUMMARY OF THE INVENTION

The present invention relates generally to a method and device for locking onto a carrier signal located within a frequency band of a digitally modulated analog signal. More particularly, the method includes: dividing the frequency band into a plurality of segments, measuring a signal quality value for each of the segments, selecting one of the segments based on the measured signal quality values, and sweeping the selected segment using a front-end circuit in a receiver adapted to lock onto the carrier signal. One method of selecting the segment is to choose the segment having the highest signal quality value. Another aspect of the method according to the present invention involves setting a threshold value in the front-end circuit based on the measured signal quality values prior to sweeping the selected segment. Preferably, the threshold value is set to a value higher than the average signal quality value measured for each segment, but lower than the signal quality value for the selected segment.

A device according to an embodiment of the present invention includes a programmable controller, a signal quality measurement unit, and a front-end circuit in a receiver. The controller executes a program that may include several routines. A first routine divides the frequency band into a plurality of segments, and the signal quality measurement unit, in response to the controller, measures a signal quality value for each of the segments. A second routine selects one of the segments based on the measured signal quality value for each segment. The second routine preferably selects the segment having the highest signal quality value. The front-end circuit is coupled to the controller and sweeps the segment selected by the second routine in order to lock onto the carrier signal. The second routine may set a threshold value in the front-end circuit based on the measured signal quality values prior to enabling the front-end circuit to sweep the selected segment. Preferably, the second routine sets the threshold to a value higher than the average signal quality value measured for each segment, but lower than the signal quality value for the selected segment. In addition, the second routine may periodically reduce the threshold value in the front-end circuit in small increments while the front-end circuit is attempting to lock onto the carrier signal.

According to another aspect of the present invention, the second routine may periodically measure and then store the signal quality value and frequency offset of the carrier signal in a controller memory after the front-end circuit has locked onto the carrier signal. If the receiver later loses the carrier signal, the second routine may then read the stored signal quality value and frequency offset from memory to select a frequent segment during re-acquisition of the carrier signal.

Accordingly, the present invention provides a method and device for quickly and accurately locking onto a carrier signal located within a frequency band of signals. The invention itself, together with further objects and attendant advantages, will best be understood by reference to the following detailed description, taken in conjunction with the accompanying drawings.

BRIEF DESCRIPTION OF THE DRAWINGS

FIG. 1 is a diagram of a satellite dish and video processor unit for receiving and decoding signals transmitted from a satellite.

FIG. 2 is a block diagram of a front-end processing circuit embodying the present invention. The front-end processing circuit may be utilized in the video processor unit shown in FIG. 1.

FIGS. 6–15 are various states of a flow chart of a program capable of being executed by the controller shown in FIG. 4. The illustrated program controls the front-end processing circuit shown in FIGS. 2 and 3.

DETAILED DESCRIPTION OF THE DRAWINGS

Figure 3:
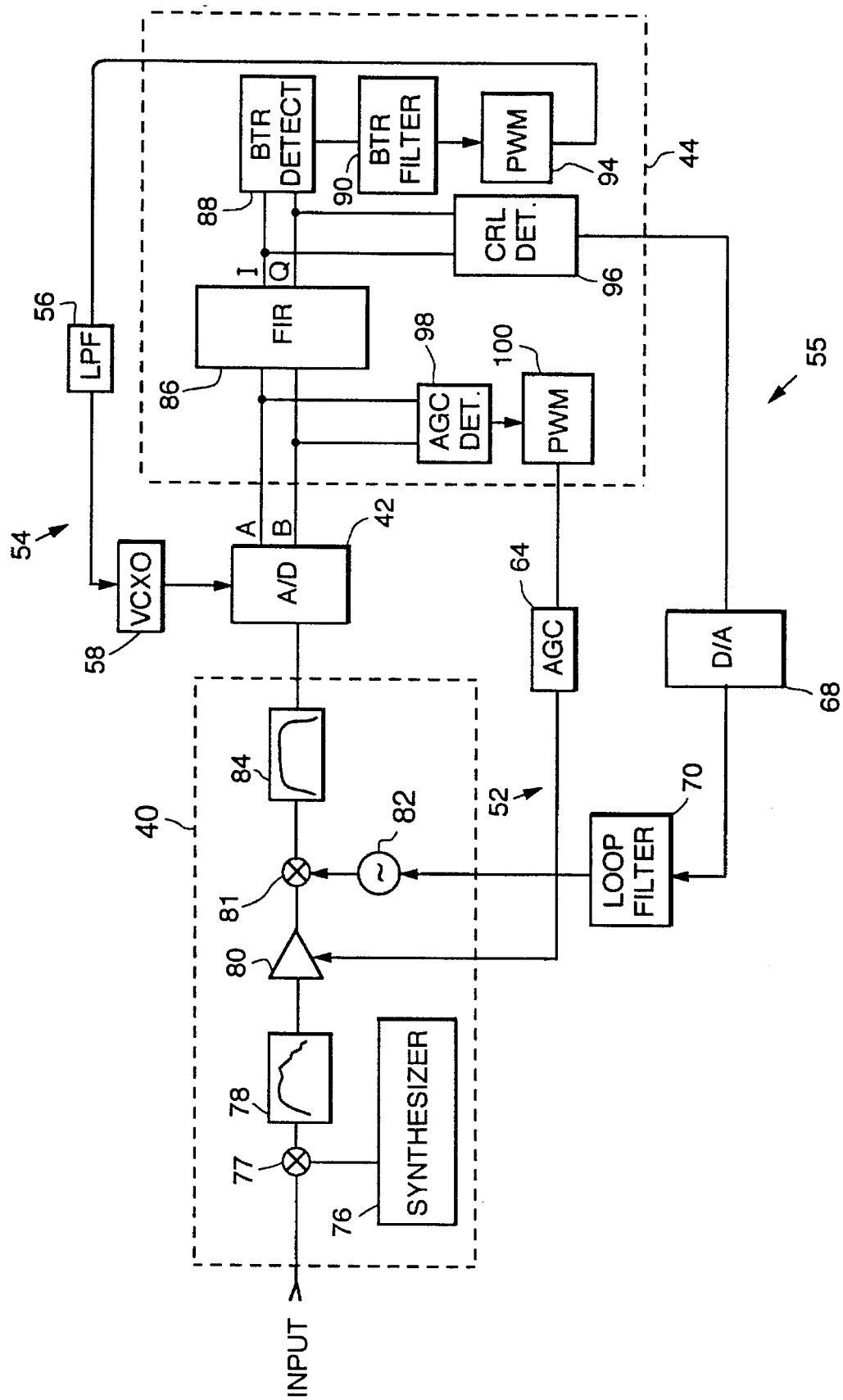
FIG. 3 is a block diagram illustrating in more detail the tuner, A/D converter, and demodulator shown in FIG. 2.

FIG. 1 is a block diagram of a receiver 20 embodying the present invention. The receiver 20 is part of a "wireless cable" television system that allows consumers to receive directly in their homes up to 150 television channels broadcast from a pair of powerful satellites (not shown). The receiver 20 includes a small 18 inch satellite dish 22 connected by a cable 24 to a video processor unit 26. The satellite dish 22 is aimed at the satellites, and the processor unit 26 is connected to a television 28 in a similar fashion as a conventional VCR connection. The satellite dish 22 receives Ku-band signals from the satellites, shifts the Ku-band signals down to L-band, and transmits the L-band signals through the cable 24 to the video processor unit 26. Front-end circuitry 36 (shown in detail in FIGS. 2, 3 and 4) inside the unit 26 receives the L-band RF signals from the cable 24, and converts them into the original digital data stream of video/audio signals. Video/audio decoder circuits (not shown) receive the original data stream from the front-end circuitry 36 and perform video/audio processing operations such as demultiplexing and decompression.

The present invention relates generally to the front-end circuitry 36 in the video processor unit 26. The front-end circuitry 36 receives a frequency band of digitally encoded L-band signals, and converts them into a channel band of digital data suitable for processing by video/audio decoders.

FIG. 2 is a block diagram of front-end processing circuitry 36 embodying the present invention. The major components of the front-end circuit 36 for practicing the present invention are a tuner 40, an A/D converter 42, a demodulator 44, a Viterbi forward error correction decoder 46 and a microcontroller interface 50. The interface 50 is an 8 bit parallel bus interface and is well known in the art. Preferably, the front-end circuitry 36 occupies part of a single printed circuit board (not shown).

The tuner 40 receives L-band signals from the cable 24 (shown in FIG. 1) and isolates a particular transponder channel of frequencies based on channel selection instructions received from the micro-controller 110 (shown in FIG. 4) via the interface 50. The transponder channel is then converted into a digital data stream in the A/D converter 42, and the data stream is demodulated in the demodulator 44. The A/D converter 42 is preferably a conventional converter, such as a PCA856, available for purchase from GEC Plessey Semiconductor Co., Microelectronics Center, Tweedaleway, Hollinwood, United Kingdom.

FIG. 2 also shows a bit timing recovery loop ("BTR loop") 54 which synchronizes the demodulator timing signal to the transmit symbol rate. The BTR loop 54 includes circuitry inside the demodulator chip 44 (BTR detector 88, BTR filter 90, and Pulse Width Modulator 94 shown in FIG. 3), a smoothing low pass filter (LPF) 56, a voltage controlled crystal oscillator (VCXO) 58, and the A/D converter 42. The demodulator 44 determines a BTR error signal in the BTR detector 88, filters the BTR error signal in the BTR filter 90, and outputs a pulse width modulated signal using the PWM circuit 94. The demodulator 44 is preferably a custom designed ASIC (application specific integrated circuit). A suitable demodulator ASIC can be implemented by a person having ordinary skill in the art based on the disclosure herein.

The LPF 56 smooths the pulse width modulated signal to control the output of the VCXO 58 which controls the frequency output to the A/D converter 42. The LPF 56 is preferably a conventional RC type low pass filter. The VCXO 58 is preferably a TFG-766 DV type voltage controlled crystal oscillator available from Toyocom USA, Inc.

A carrier recovery loop ("CRL") 55 enables the tuner's local oscillator (LO) 82 (shown in FIG. 3) to lock onto the frequency and phase of the carrier signal. The carrier recovery loop (CRL) 55 includes circuitry inside the demodulator chip 44 (CRL detector 96 shown in FIG. 3), a D/A converter 68, an analog loop filter 70, and the LO 82 (shown in FIG. 3) inside the tuner 40. The D/A converter 68 is preferably a conventional CXD 1171M D/A converter available from Sony Corp. The analog loop filter 70 is a low pass filter that may be implemented as an operational amplifier in combination with an RC circuit. The operational amplifier may be a standard Texas Instruments LM358.

The demodulator chip 44 outputs to the D/A converter 68 an estimate of the instantaneous phase difference between the incoming IF carrier and the LO 82. A look-up table is used to determine the needed adjustments based on the estimated phase difference. The D/A converter 68 converts the CR phase detector's output to analog and feeds the adjustment to the LO 82.

Preferably, the CR detector 96 in the CRL 55 compensates for carrier phase offsets in QPSK by using a look-up table to store the desired settings. It should be noted that the frequency and phase adjustments in the CRL 55 call for more precision than the timing adjustments in the BTR loop 54. Accordingly, a D/A converter 68 should be used instead of PWM circuits to provide digital to analog conversion in the CRL 55.

FIG. 3 is a more detailed block diagram of the tuner 40, A/D converter 42, and demodulator chip 44 shown in FIG. 2. The tuner 40 is preferably a semi-custom tuner available from Sharp model number BSFB5521. The tuner 40 includes a synthesizer 76, a first multiplier 77, a channel selection filter 78, an amplifier 80, a second multiplier 81, LO 82, and shaping filter 84. The tuner 40 receives the L-band input having a range from about 950 MHz to about 1450 MHz. The synthesizer 76 receives channel selection information from the micro-controller 110 via the interface 50 (shown in FIG. 2). The first multiplier 77 shifts the L-band down to about 480 MHz. The channel selection filter 78, centered at about 480 MHz, filters all but the desired frequency band (known as transponder channels). The amplifier 80 applies a gain to the transponder channel, and the second multiplier 81 shifts the 480 MHz signal down to an intermediate frequency (IF) of about 60 MHz. The LO 82 tunes the transponder channel to the carrier frequency and phase.

Figure 4:
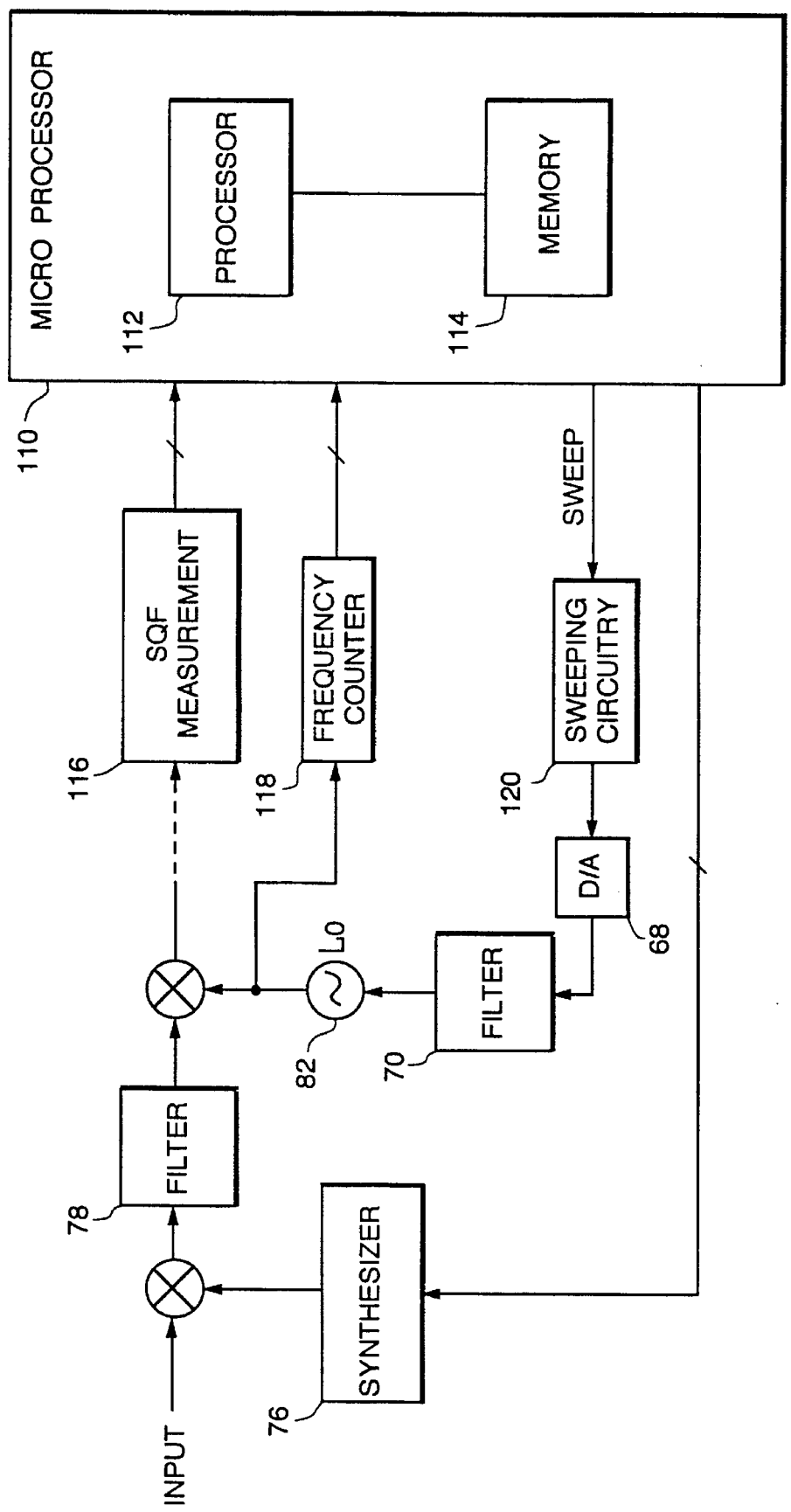
FIG. 4 is a block diagram illustrating in more detail the tuner and demodulator shown in FIG. 2.

The present invention provides a method and device for locking onto the carrier signal located within the IF signal that may be used in a video processing unit of the type described herein. FIG. 4 is a more detailed illustration of components in the tuner 40 and demodulator 44 that may be used by the receiver 20 to lock onto the carrier signal. FIG. 4 shows a microcontroller 110 including a processor 112 and a memory 114. The microcontroller is preferably a standard 16 bit microprocessor such as model ST9 made by Thompson. The memory 114 is connected to the processor 112 in a conventional manner using a communication bus and is adapted to store routines to be executed by the processor 112. The routines typically are programmed in a high level programming language such as C language and then compiled and loaded onto the memory 114 for execution by the processor 112.

The controller 110 generates a sweep signal to control a sweeping circuit 120. The sweeping circuit 120 is connected to the digital to analog (D/A) converter 68, filter 70, and local oscillator (LO) 82 described above in connection with FIGS. 2 and 3. The sweeping circuit 120 is preferably implemented as a component within the demodulator ASIC 44 described above. The controller 110 is also connected to the synthesizer 76 so that the controller 110 can send the synthesizer 76 channel selection information.

The controller 110 communicates with a signal quality factor (SQF) measurement unit 116 and a frequency counter 118. The SQF measurement unit 116 generates an SQF value that indicates the signal quality value of the received signal at the frequency and phase of the LO 82. The SQF value may be read by the controller 110. The frequency counter 118 detects the frequency of the LO 82 and generates a frequency count measurement that is received by the controller 110. The controller 110 uses the SQF value and the frequency count to control the sweeping circuit 120 based on instructions programmed in a routine loaded in memory 114 so that the front-end circuit 36 can lock onto a carrier signal in a predetermined frequency band of the input signal. Preferably, both the SQF measurement unit 116 the frequency counter 118 are components of the demodulator circuit 44 described above.

Figure 5:
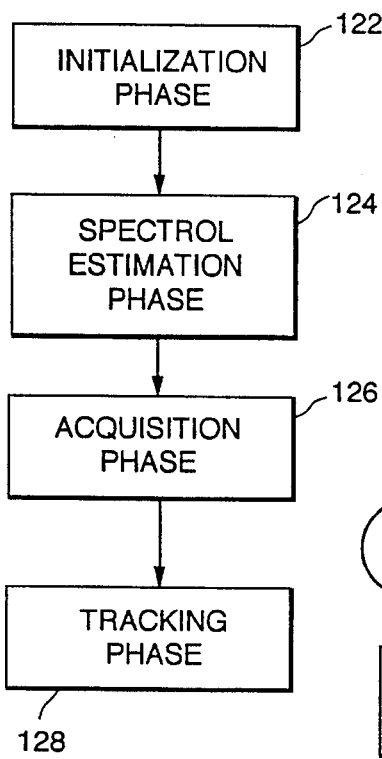
FIG. 5 is a process flow diagram of a program capable of being executed by the controller shown in FIG. 4.

FIG. 5 illustrates four phases of a routine executed by the processor 112 for locking onto the carrier signal. The four phases are an initialization phase 122, a spectral estimation phase 124, an acquisition phase 126, and a tracking phase 128. The initialization phase 122 preferably includes the following steps. First, the controller 110 initializes the sweep rate by sending a signal to the sweep circuit 120 and then inhibits the BTR loop 54 and the CRL loop 55. The controller 110 then instructs the sweeping circuit 120 to enter a sweep mode, programs the synthesizer 76, and initializes the SQF measurement unit 116 to start SQF peak detection.

During the spectral estimation phase 124, the controller 110 first divides the frequency band to be swept into a plurality of segments. Preferably, the frequency band is 4 MHz and the band is divided into 10 400 KHz segments. However, it should be understood that the present invention is not confined to a specific frequency band size or specific number of segments. Moreover, the frequency band may itself be a segment of a larger frequency band, in which case the process used herein may be repeated for other frequency bands allocated as segments within the larger band if the carrier signal is not found in the original frequency band. Preferably, the first frequency band swept is a middle segment of a larger 12 MHz band also having lower and upper 4 MHz segments. Because frequency band size does not usually change dynamically, the frequency band may alternatively be divided into segments during or even before the initialization phase 122.

For each segment, the controller 110 activates the sweeping circuit 120 to sweep the segment using the LO 82, and the SQF measurement unit 116 generates an SQF value read by the controller 110. As each segment is swept, the controller 110 saves the SQF value in memory 114, adds the SQF value to previous SQF values, and determines if the measured SQF value is the highest measured SQF value. After all segments have been swept, the controller 110 averages the SQF values for all segments and saves the average SQF value in memory 114 as the noise floor. Finally, the controller 110 sets sweep to the segment having the highest SQF value and starts the BTR loop 54.

During the acquisition phase 126, the controller 110 sets a receiver lock threshold in the sweeping circuit 120 of the CRL 55 based on the noise floor. Preferably, the threshold is set to the noise floor plus 6 SQF units. The controller 110 then enables receiver lock detection circuitry, such as the CRL 55 so that the front-end circuit 36 now attempts to lock onto the carrier signal. The controller 110 preferably sets a 10 ms interrupt so that the controller 110 can periodically decrease the threshold value in small increments, such as 2 SQF units, if the carrier is not locked.

During the tracking phase 128 after the carrier signal has been locked, the controller 110 preferably adjusts the CRL 55 parameters for optimum tracking. At this point in the process, the front-end circuit 36 has successfully locked onto the carrier signal using the preferred method and device according to the present invention.

According to another aspect of the present invention, the controller 110 may periodically read and then store in memory 114 an SQF measurement value from the SQF unit 116 and a frequency offset value from the frequency counter 118. If the receiver thereafter loses lock, possibly resulting from a variety of conditions such as channel changing or signal fading, the controller 110 initiates re-acquisition. Re-acquisition uses substantially the same process as the acquisition phase 126 described above except that the controller 110 uses the post-lock SQF value and post-lock frequency offset values to select the correct segment and to set the threshold value.

Figure 6:
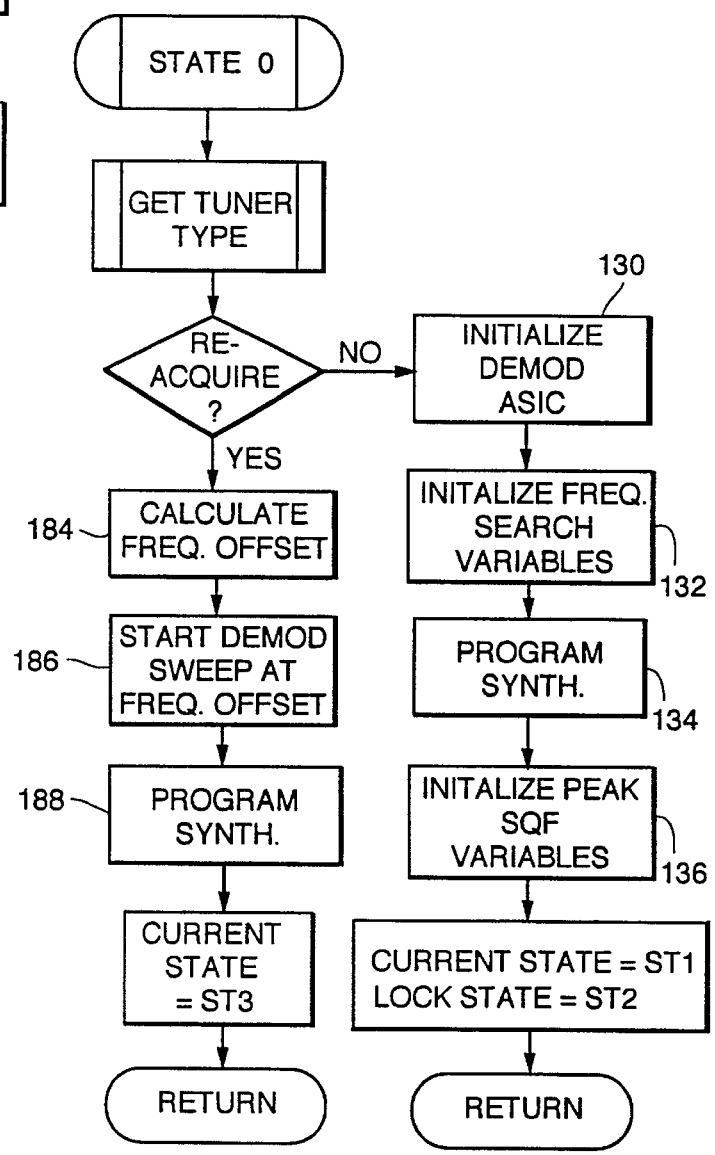

FIGS. 6–15 show detailed flow charts of a preferred embodiment of a program including routines to be stored in the memory 114 and executed by the controller 110. Referring to FIG. 6, the controller 110 first determines the tuner type and then determines whether to perform an original signal acquisition or a re-acquisition. For an original carrier signal acquisition, the controller 110 initializes the demodulator 130, initializes frequency search variables 132, programs the synthesizer 134, and initializes peak SQF variables. Processing then continues at state 1 shown in FIG. 7.

Figure 7:
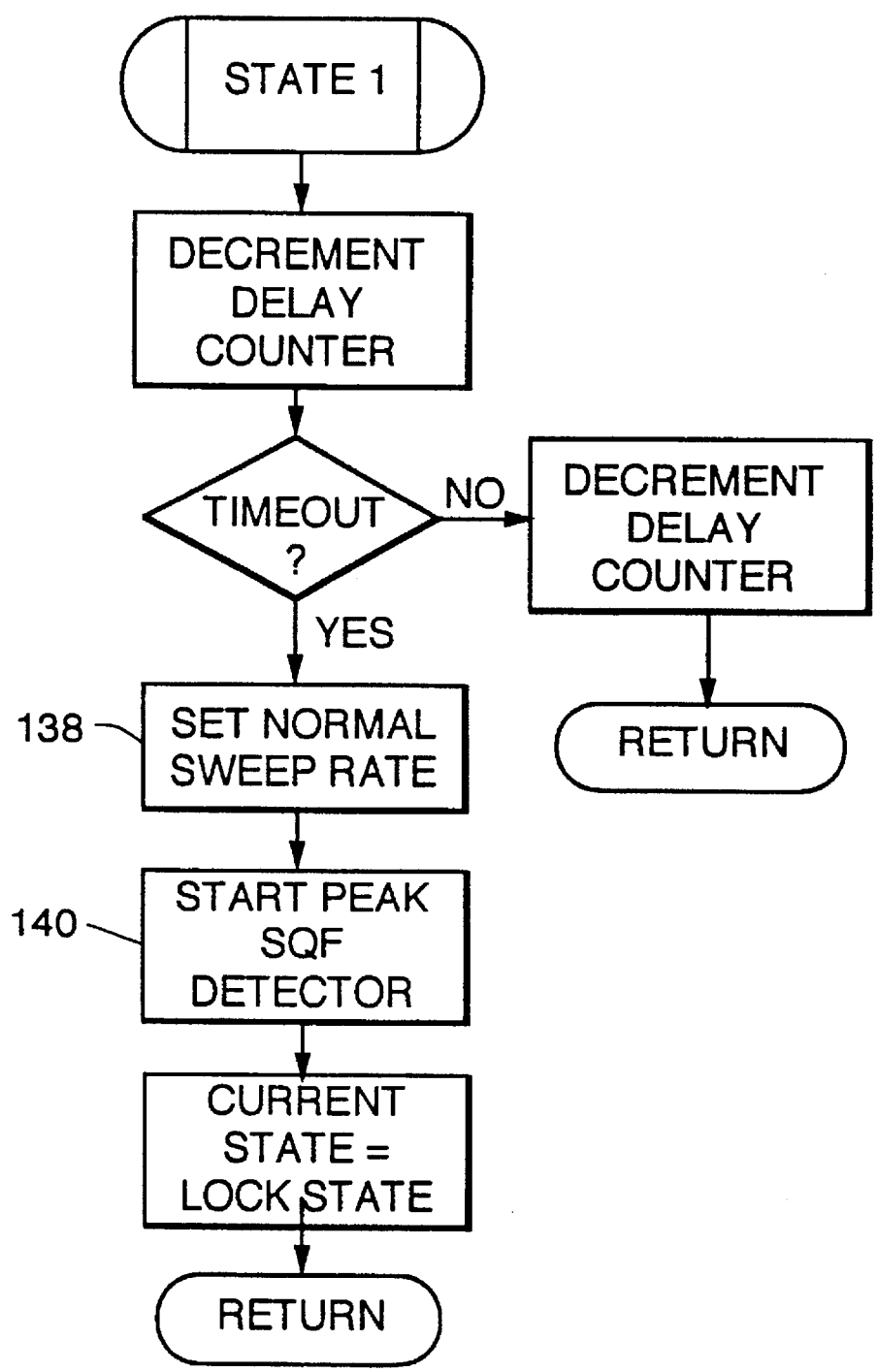
Figures 8, 9:
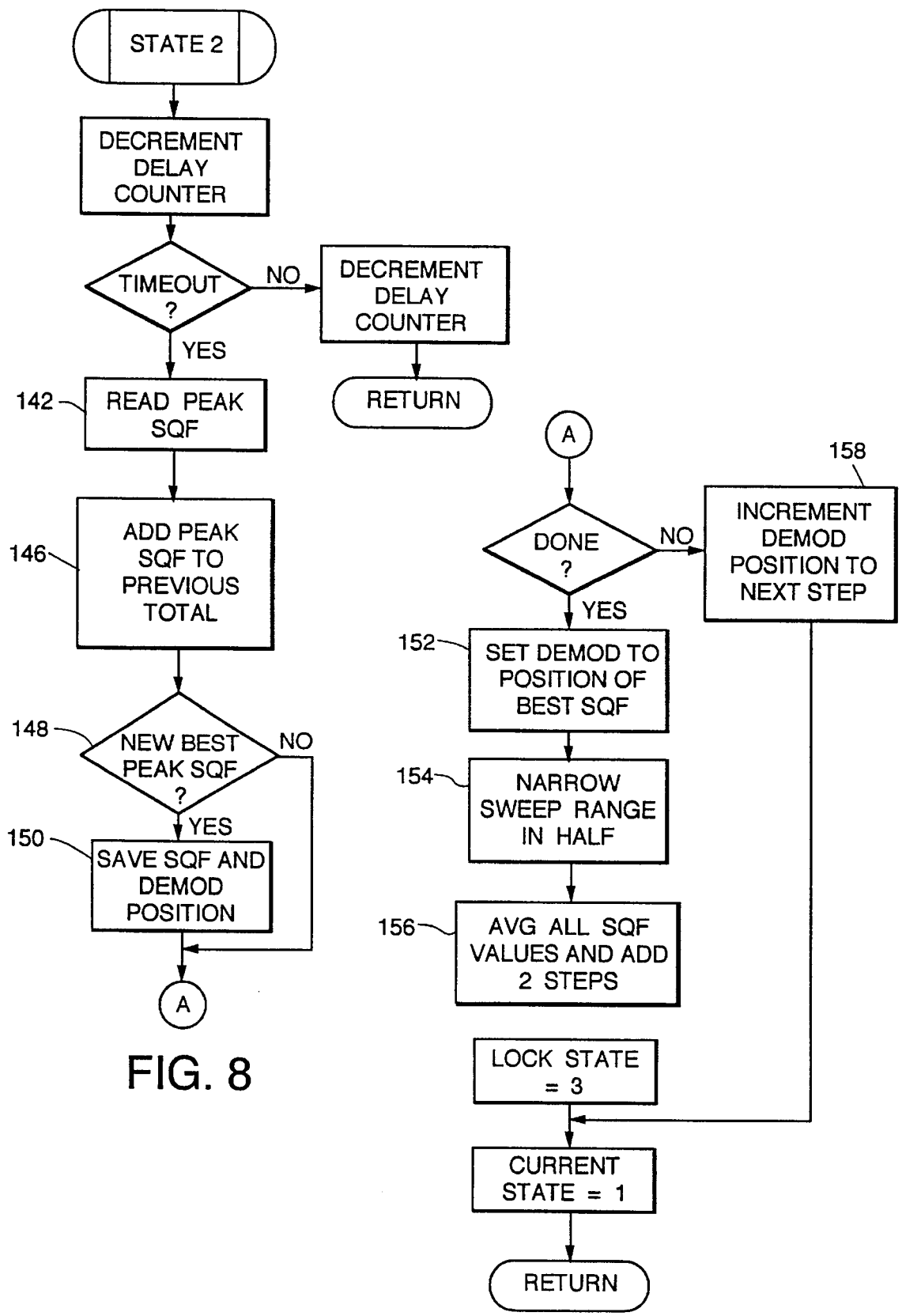

FIG. 7 shows the program steps of setting the normal sweep rate 138 in the sweeping circuit 120 and starting peak SQF detection 140. Referring to FIG. 8, for each of the segments in the frequency band, the controller 110 reads the peak SQF value 142, adds the peak SQF value to the total for previous SQF peak values 146, and determines whether the newly read SQF value for a particular segment is the best SQF value 148. If so, the newly read SQF value and demodulator position, i.e. segment, is saved 150. Preferably, timers are used so that SQF peak detection is performed for a predetermined amount of time for each segment. Also, in the disclosed embodiment, the frequency band is allocated into segments before processing by another routine begins in the controller 110, although the segments could be allocated dynamically.

Figure 10:
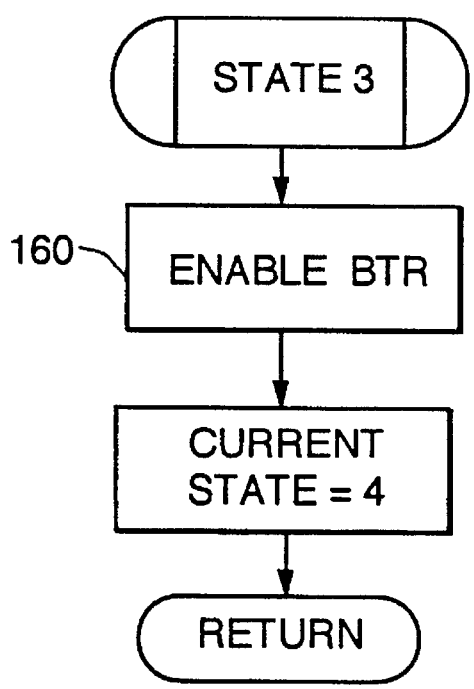

Referring to FIG. 9, after sweeping, all segments, the demodulator is set to the segment having the best SQF value 152. The controller 110 then resets the sweep range 154 and averages all SQF values 156. The program then returns to state 1 shown in FIG. 7 to restart sweeping 138 and SQF peak detection 140 in the selected segment. Processing continues in state 3 where the bit timing recover loop 54 is enabled 160 as shown in FIG. 10.

Figure 11:
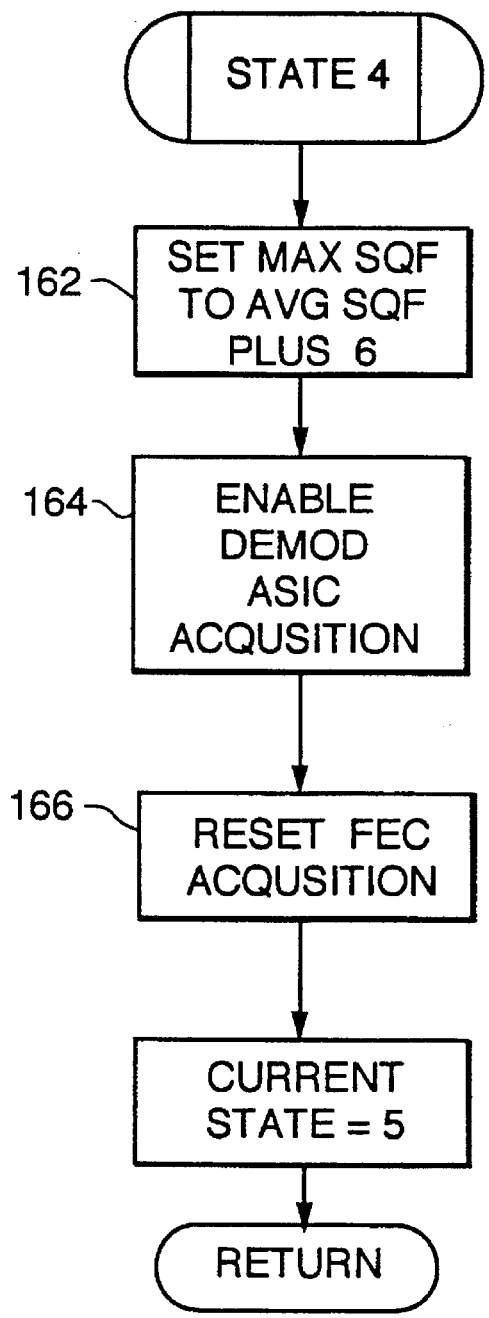

Referring now to FIG. 11, the threshold value is set to the average SQF value plus 6 SQF units 162, and demodulator acquisition is then enabled 164. Also, the controller 110 resets forward error correction (FEC) 36 in the Viterbi decoder 46 (step 166).

Figure 14:
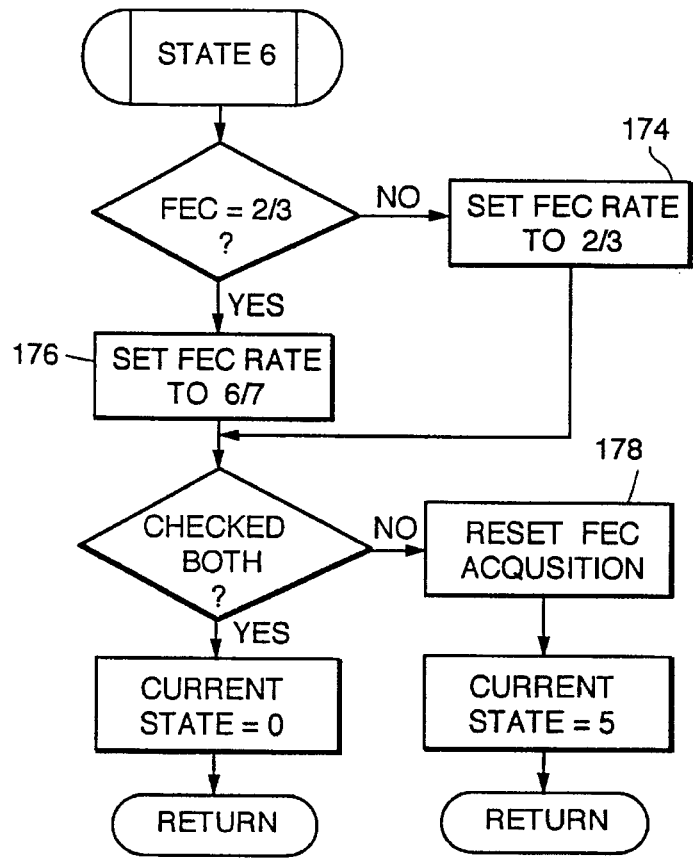

In FIG. 12, the controller 110 first determines whether the FEC 36 is locked. If the FEC 36 is locked, then the demodulator is setup for tracking 168 and processing continues at state 7 shown in FIG. 15. If the FEC 36 is not locked, then if a timeout has occurred the carrier recovery loop 55 is checked to determine if the CRL 55 has locked onto the carrier signal. If CRL 55 lock has occurred, processing continues at state 6, and FEC acquisition continues as shown in FIG. 14. Otherwise, processing returns to state 0 shown in FIG. 6 where processing is stopped or the entire signal acquisition process may be reattempted, perhaps at another frequency band. However, if a timeout has not occurred and the FEC 36 is not locked then processing continues as shown in FIG. 13.

FIG. 13 shows the process of periodically reducing the threshold value by a small increment such as 2 SQF units during the carrier recovery loop locking process. However, it should be noted that the threshold value generally should not be set lower than the noise floor, i.e. the average SQF value for each of the segments.

FIG. 14 shows FEC acquisition using either a ⅔ rate or a 6/7 rate. Both of these rates are preferably checked before leaving the FEC acquisition process and returning to state 0 of FIG. 6.

Figure 15:
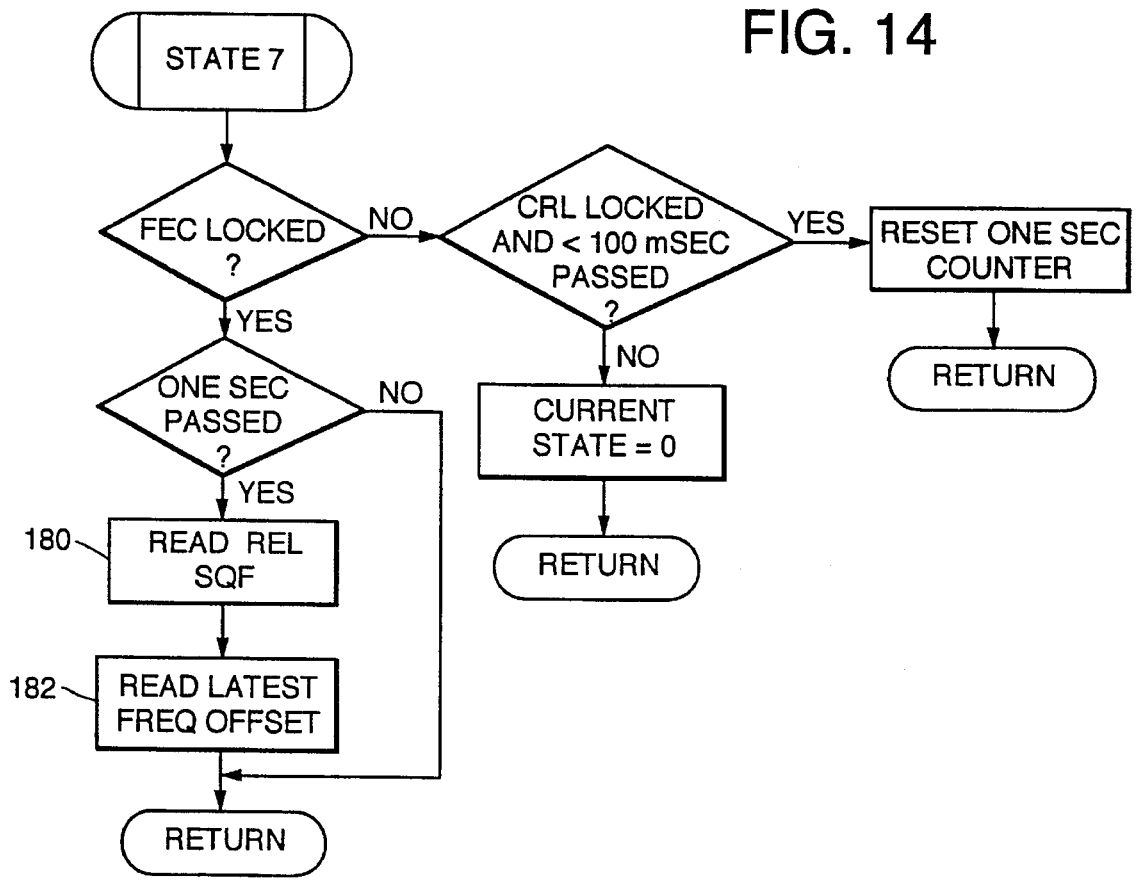

Finally, FIG. 15 shows the tracking state where the controller 110 may periodically read the SQF value 180 and frequency offset of the carrier signal 182. Both the SQF value and the frequency offset are stored in memory and may be used during signal reacquisition, as shown in FIG. 6, steps 184 and 186.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method of locking onto a carrier signal located within a frequency band comprising the steps of:

dividing the frequency band into a plurality of segments;

measuring a signal quality value for each of the segments;

setting a threshold value in a front-end circuit based on the measured signal quality, wherein the threshold value is set to a value higher than an average signal quality value measured for each segment, but lower than the signal quality value for the selected segment;

periodically reducing the threshold value in small increments while the front-end circuit is attempting to lock onto the carrier signal;

selecting one of the segments based on the measured signal quality values; and sweeping the selected segment to lock onto the carrier signal.

2. The method of claim 1, wherein the signal is a digitally modulated analog signal.

3. The method of claim 2, wherein the front-end circuit comprises a carrier recovery loop and a local oscillator.

4. The method of claim 3, wherein the front-end circuit further comprises a bit timing recovery loop.

5. The method of claim 2, wherein the signal quality comprises an SQF measurement value.

6. The method of claim 1, wherein the segment selected has higher signal quality than any of the other segments.

7. The method of claim 1, further comprising the step of periodically measuring and storing the signal quality and frequency offset of the carrier signal after locking onto the carrier signal.

8. The method of claim 1, further comprising the step of using the stored signal quality and frequency offset to select a frequency segment during re-acquisition of the carrier signal.

9. The method of claim 1, wherein the frequency band is incorporated into one segment of a large frequency band having a plurality of segments.

10. A device for locking onto a carrier signal located within a frequency band of a signal comprising:

a controller including a first routine for dividing the frequency band into a plurality of segments;

a measurement unit in communication with the controller for measuring signal quality for each of the segments;

a second routine disposed in the controller and in communication with the measurement unit for selecting one of the segments based on the measured signal quality for each segment; and a front-end circuit coupled to the controller for sweeping the segment selected by the second routine in order to lock onto the carrier signal, wherein the second routine sets a threshold value in the front-end circuit based on the measured signal quality for each segment, and wherein the second routine periodically reduces the threshold value in small increments while the front-end circuit is attempting to lock onto the carrier signal.

11. The device of claim 10, wherein the front-end circuit comprises a local oscillator coupled to a carrier recover loop including a phased lock loop.

12. The device of claim 10, wherein the signal quality comprises an SQF measurement value.

13. The device of claim 10, wherein the second routine selects the segment having the highest signal quality.

14. The device of claim 10, wherein the second routine sets the threshold in the front-end circuit to a value higher than the average signal quality measured for each segment but lower than the signal quality for the selected segment.

15. The device of claim 10, wherein the front-end circuit further comprises a bit timing recovery loop.

16. The device of claim 10, wherein the second routine periodically measures and stores the signal quality and frequency offset of the carrier signal in a memory of the controller after the front-end circuit has locked onto the carrier signal.

17. The device of claim 16, wherein the second routine reads the stored signal quality and frequency offset from memory and uses the signal quality and frequency offset to select a frequency segment during re-acquisition of the carrier signal.

18. The device of claim 10, wherein the signal is a digitally modulated analog signal.

19. The device of claim 18, wherein the digitally modulated analog signal comprises an IF signal.

* * * * *